United States Patent [19]

Frase et al.

[11] Patent Number: 4,526,485
[45] Date of Patent: Jul. 2, 1985

[54] SEALED ROLLING ELEMENT BEARING

[75] Inventors: Dietmar Frase, Dittelbrunn; Roland Eisenkolb, Schweinfurt; Heinz Kiener, Waigolshausen; Güter Harant, Obereuerheim, all of Fed. Rep. of Germany

[73] Assignee: SKF Kugellagerfabriken GmbH, Schweinfurt, Fed. Rep. of Germany

[21] Appl. No.: 84,872

[22] Filed: Oct. 15, 1979

[30] Foreign Application Priority Data

Nov. 11, 1978 [DE] Fed. Rep. of Germany ... 7833640[U]

[51] Int. Cl.³ .............................................. F16C 33/78
[52] U.S. Cl. ..................................................... 384/486
[58] Field of Search ............ 308/187.1, 187.2, 189 R, 308/36.1, 36.2, 187; 277/29; 384/486, 485, 484, 147, 148

[56] References Cited

U.S. PATENT DOCUMENTS 3,208,779 9/1965 Sullivan ................................. 277/29
3,322,445 5/1967 Hassan ................................... 277/29
3,572,379 3/1971 Popa et al. ............................. 277/29

FOREIGN PATENT DOCUMENTS 673726 6/1952 United Kingdom .
1204345 9/1970 United Kingdom .
1287700 9/1972 United Kingdom .
1474116 5/1977 United Kingdom .

Primary Examiner—Lenard A. Footland
Attorney, Agent, or Firm—Daniel M. Rosen

[57] ABSTRACT

A rolling element bearing has annular seals between the races for preventing entry of dirt into the lubricant space. The seals are held to one of the races, and have weakened portions on at least one location about their periphery to enable excess pressure within the lubricant chamber to escape.

4 Claims, 8 Drawing Figures

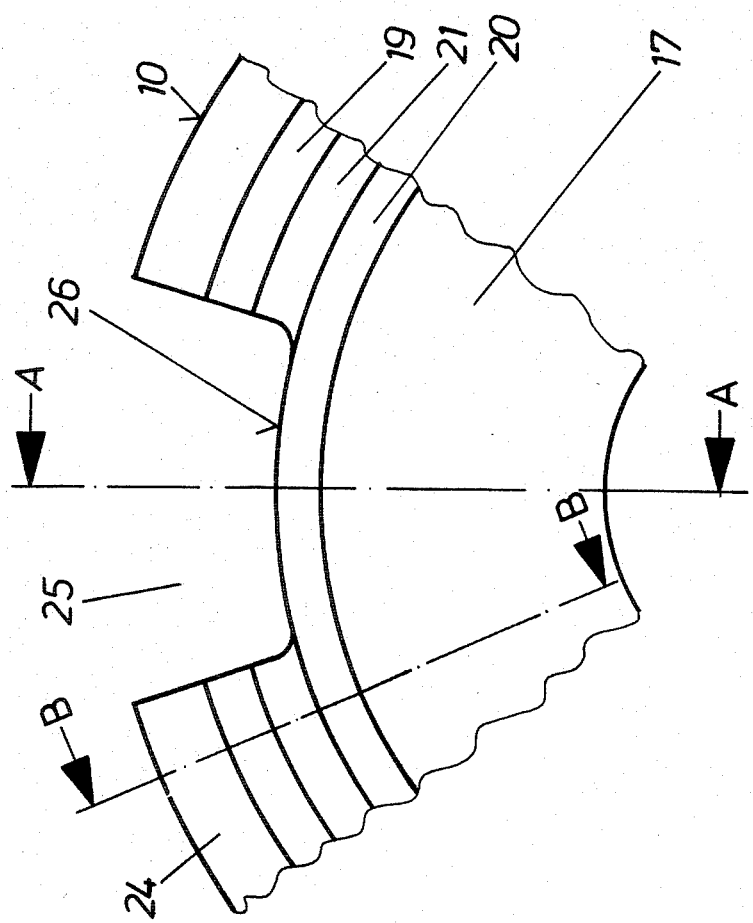
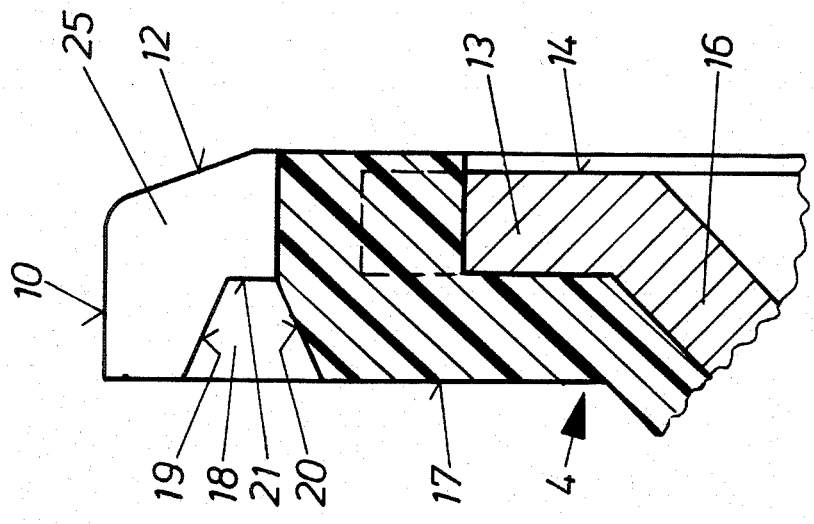

SEALED ROLLING ELEMENT BEARING

BACKGROUND OF THE INVENTION

This invention relates to a rolling element bearing having a rolling element chamber sealed by elastic gaskets secured to one of the races.

Dependable seals for rolling element bearings are an essential prerequisite for long service life of the bearing, and consequently of a machine or a motor vehicle using the bearings. Furthermore, sealed bearings simplify design because, in general, no additional packing is required, and the lubricant fill suffices for the life of the bearing. The installation space required for such sealed rolling bearings is small, assembly is problem-free, and the hazard of fouling during installation or in service is nonexistent.

In a known type of double-row tapered roller bearing (British Pat. No. 1,191,685), the inner bearing space is completely closed off laterally from the outside by a seal housing. This lateral seal housing is secured in an annular groove in the outer race, and a corrugated sealing ring is mounted in the groove. The sealing lips of the sealing ring slide on a spacer sleeve mounted on a shaft. For air supply to and exhaust from the rolling element chamber, passages are provided in the seal housing. These passages are closed by plastic inserts overlapping on the outside of the sealing ring. These overlaps may alternatively be formed integrally with the corrugated sealing ring. The arrangement of through-slits in the outer overlap is intended not only to vent, but also to aerate the rolling element chamber. Such through-slits, however, venting and aerating the rolling element chamber, are not universally useful, since they present no barrier to dirt entering the chamber from the outside. Such dirt entering the rolling element chamber from the outside substantially shortens the life of the bearing. Severe fouling may even result in destruction of the bearing.

The present invention provides a rolling element bearing having a rolling element chamber closed off externally by means of elastic gaskets, that permit firstly an excess pressure equalization of the rolling element chamber under operating condition and secondly ensure a dependable seal both externally and internally.

The sealing arrangement according to the present invention renders it possible not only to prevent entry of dirt into the rolling element chamber, but also to permit excess pressure generated by heating in the rolling element chamber while the bearing is in operation, and consequently trapped there, to be vented promptly to the outside by an elastically yielding opening of a weak spot in the sealing ring, thus ensuring a pressure equalization of the chamber in case of excess pressure. This "weak spot" in the gasket springs back like a diaphragm to is initial position after the excess pressure escapes, thus restoring the seal between the rolling element chamber and the outside. Since excess pressure can blow off only from the rolling element chamber to the outside, any penetration of dirt into the rolling element chamber from the outside is precluded. The brief opening and closing of the weak spot also prevents lubricant from being lost by leakage from the rolling element chamber. This means that the lifetime lubricant fill will be kept in the bearing, thus ensuring a long service life for the bearing.

BRIEF FIGURE DESCRIPTION

In order that the invention may be more clearly understood, it will now be disclosed in greater detail by reference to the accompanying drawings, wherein:

FIG. 3 is an enlarged cross-section of a portion of a seal according to the present invention, taken along the line A—A of FIG. 4;

FIG. 4 is an end view of the seal of FIG. 3 with excess pressure equalization;

DETAILED DESCRIPTION OF THE INVENTION

Figure 1:
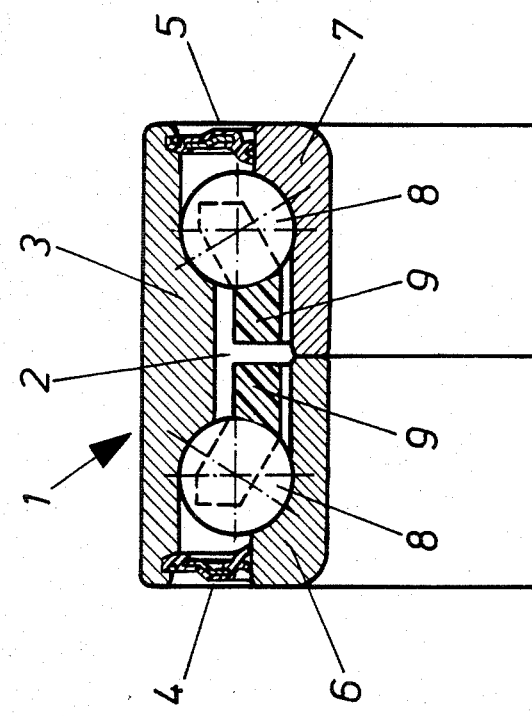
FIG. 1 is a partial cross-section of a double-row angular contact ball bearing with built-in seals.

To illustrate the basic environment of the seal of this invention, a double-row angular contact ball bearing 1 is represented in FIG. 1 as a preferred embodiment. In this double-row angular contact ball bearing 1, the rolling element chamber 2 is sealed off against leakage of lubricant and against dirt entering from the outside by means of seals 4 and 5 held in annular grooves of the one-piece common outer race 3. Balls 8 roll between the inner races 6 and 7 and the tracks of the outer race 3, the balls of each row being spaced apart by cages 9. The seal 4 serves to vent the inner rolling element chamber 2 of the double-row angular contact ball bearing 1 in case of excess pressure, as will be illustrated in more detail later on in the description referred to FIG. 6.

Figure 2:
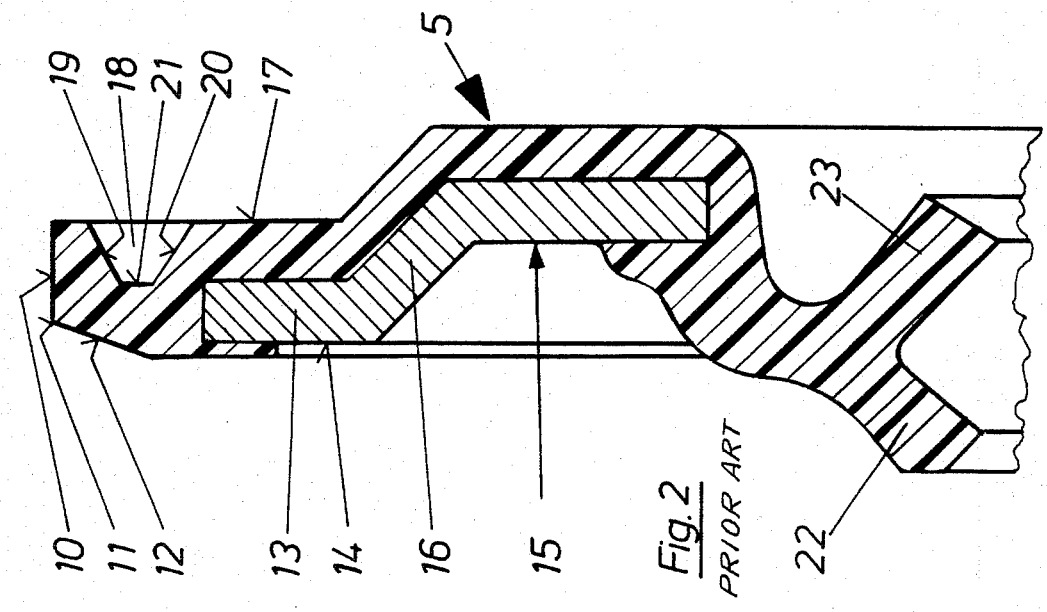
FIG. 2 is an enlarged cross-section of a known seal according to FIG. 1, before installation.

FIG. 2 is an enlarged view of a conventional seal 5 prior to insertion. This seal 5 is in the form of an annular disk consisting of an elastic material such as synthetic elastomer, natural or artificial rubber or the like, alone or in combination with fibers of some other material, for example, glass and any reinforcing parts such as, for example, an annular disk of metal or the like. The seal 5, before insertion in a bearing, has a cylindrical peripheral surface 10. This surface 10 is adjoined in cross-section via radius 11 to an inner beveled surface 12 facing the balls 8 and rolling element chamber 2. An annular reinforcing disk 13 of sheet metal forms part of the adjoining radially directed surface 14 and further comprises a central comparatively stiff web 15, set back by a jog 16 from the axially inner radial surface 14.

At the outer margin of the seal 5, on the side face 17 away from the rolling element chamber 2, an annular groove 18, having tapered side walls and weakening the material, extends in the axial direction. The width of the groove thereby decreases with increasing depth, the tapered sides 19 and 20 terminating at the radially extending floor 21 of the groove. At the inner free end, at the bore, the seal 5 is provided with two axially spaced apart sealing lips 22 and 23, which, in installed condition, form a sliding seal on a shoulder surface of an inner race 6 or 7.

FIGS. 3 to 6 show the seal 4 constructed according to the present invention. Here the outer margin or cylindrical peripheral surface 10 of the fastening portion 24 of the gasket 4 is interrupted in one location on the periphery of the seal by a cut-out 25 extending radially inwardly from the outer margin. A preferred form of the cut-out 25 interrupting the fastening portion 24 is represented in FIGS. 3 and 4, wherein the deepest point of the base 26 of the radial cut-out 25 does not at any point reach or cross the inner boundary edge of the annular groove 27 in the bearing race, namely at diameter d (see FIG. 6). According to the case, of course, instead of the form of cut-out 25 shown in FIG. 4, some other shape of cut-out may alternatively be employed such as, for example, an oval cut-out. The interruption of the outer margin of the fastening portion 24 of the seal 4 may be effected either in manufacture or subsequently thereof by simple conventional means.

Figure 5:
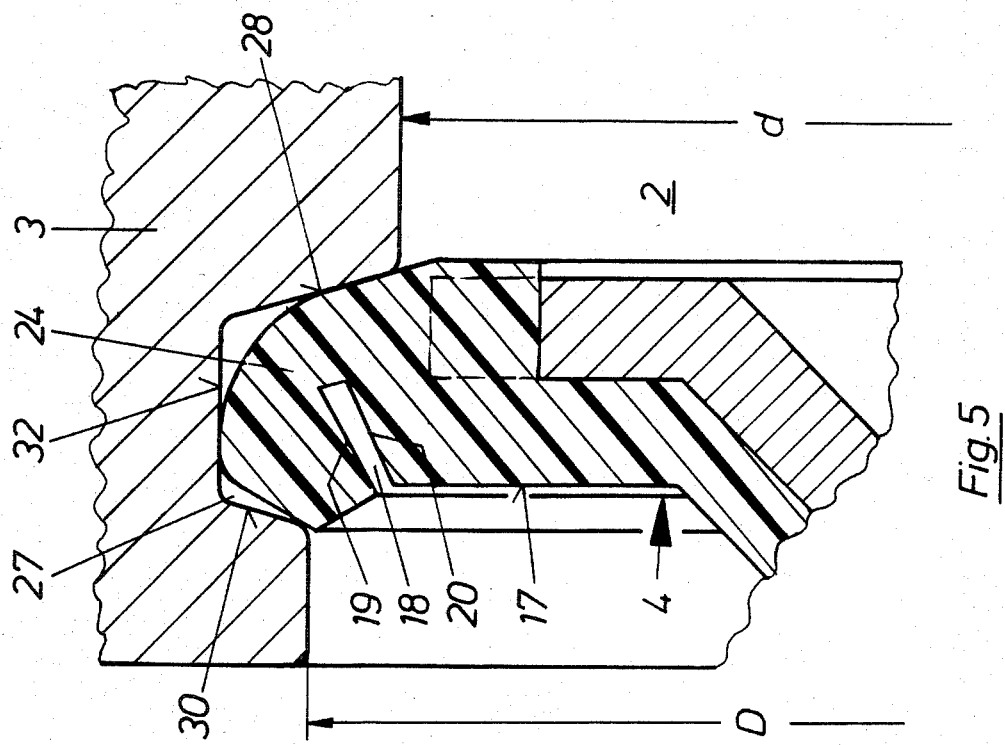
FIG. 5 is a cross-section of the fastening portion of the seal along the line B—B in FIG. 4, after insertion thereof in the bearing.

FIG. 5 shows the fastening portion 24 of seal 4, i.e., spaced from the cut-out 25 after insertion in the double-row angular contact ball bearing 1 of FIG. 1. To secure the fastening portion 24, interrupted at the outer margin, an annular groove 27 having inclined side walls is provided in the outer race 3. The fastening portion 24 can be secured in this annular groove 27 since it is elastically compressible due to the provision of tapered annular groove 18. The fastening portion 24 is so deformed at installation that the tapered sides 19 and 20 of the annular groove 18 are pressed so far towards each other all the way around the seal that they face each other with only a small gap and almost meet. In this way, the seal 4 can be snapped over the outer shoulder of the annular groove 27 into the outer race 3 as far as the inclined contact wall 28. After passing the shoulder, the fastening portion 24 spreads out again and wedges the seal 4 into annular groove 27. Since the wall 28 is inclined, the inner edge of which is located at a diameter d smaller than the bore diameter D of the shoulder of the annular groove 27, and the outer tapered wall 30, a centering and axial stressing, and consequently securing, of the fastening portion 24 of seal 4 are ensured.

Figure 6:
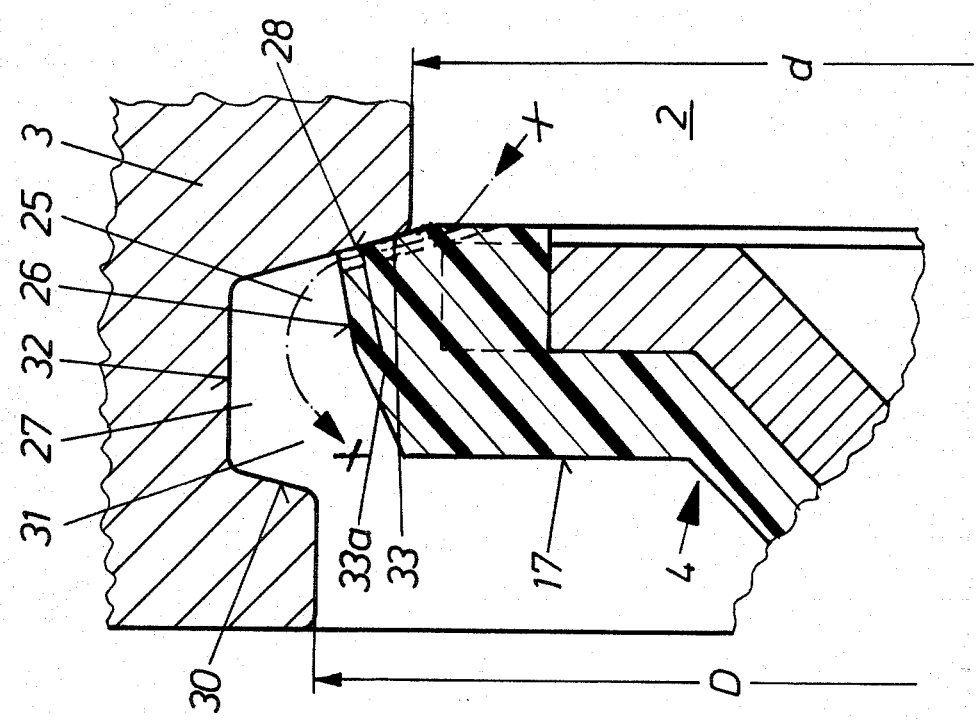
FIG. 6 is a cross-section in the region of the cut-out at the line A—A in FIG. 4 after insertion of the seal in a bearing.

FIG. 6 illustrates the above-described seal 4 in the region of the cut-out 25. The radial cut-out 25 creates a clear space 31 at one location along the periphery of the seal between the floor 32 of the annular groove 27 and the base 26 of the cut-out 25. In this space the outer margin of the fastening portion 24 is not wedged between the inclined walls 28 and 30 of the fastening groove 27. The axial stress is thereby also interrupted in the region of the cut-out 25, so that in this region only the remaining area 33 of the seal 4 is in sealing contact with the inclined wall 28 of the tapered annular groove 27.

In service, if an excess pressure is generated in the rolling element chamber 2 of the double-row angular contact ball bearing 1, for example, by heating, then that excess pressure lifts the portion 33 from the inclined wall 28 of the tapered annular groove 27, in an elastically yielding manner in the region of the cut-out 25 thereby assuming more or less the position shown in dotted lines. The excess pressure built up in the rolling element space 2 can thus escape to the outside through the open place 33a thus formed, in the direction of the arrows X, X, by way of the clear space 31. After escape of the excess pressure from the rolling element chamber 2, the portion 33 will spring back in the manner of a diaphragm to its initial position, that is, into contact with the groove wall 28, thus again sealing the rolling element chamber 2.

In the embodiment of FIGS. 3 to 6, only one cut-out 25 in the outer margin of the fastening portion 24 of seal 4 serves for escape of an excess pressure build-up in the rolling element chamber 2 of a double-rowed angle ball bearing 1. In special applications, the seal 4 may be provided with two, three or more cut-outs 25, which are preferably evenly spaced around the circumference of the seal. In the embodiment described by way of example, a seal 4 with yielding marginal portion is provided only on one side of the sealed rolling element chamber 2.

Alternatively, however, the invention may be applied to both seals, so that seal 4 and seal 5 are each provided with a cut-out 25 in the outer margin of the fastening portion 24.

Figure 7:
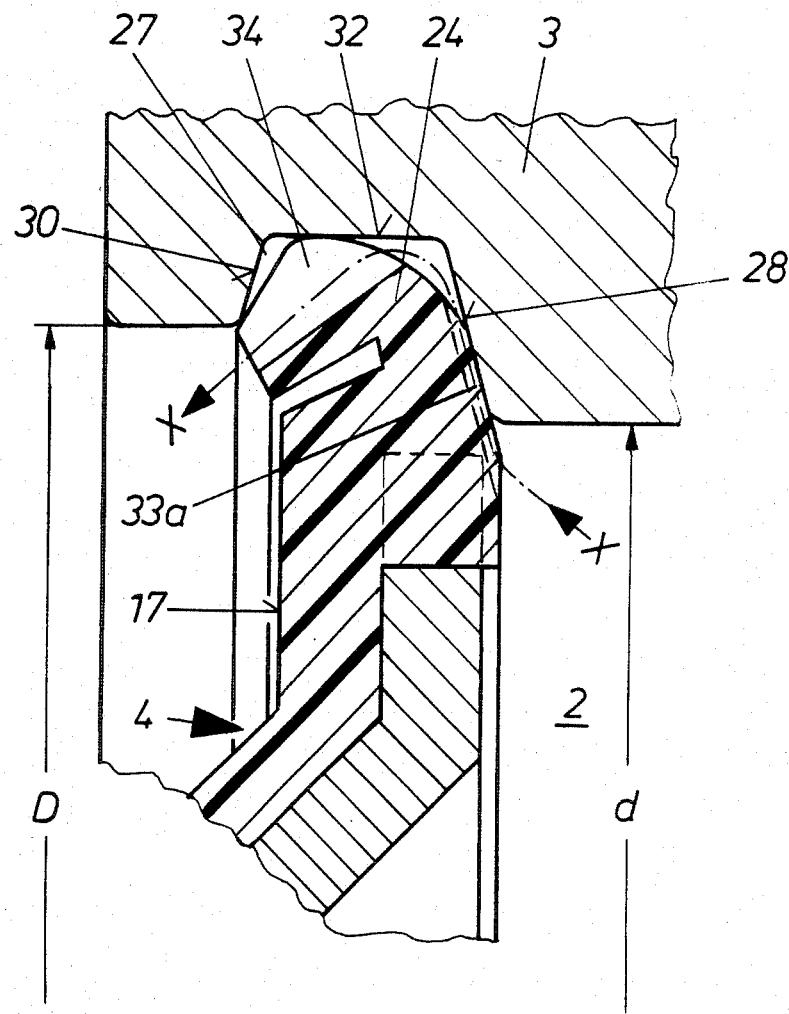
FIGS. 7 and 8 are cross-sections of another embodiment of the seal according to this invention.

The weak spot may alternatively be in the form of a cut-out extending radially on the face of the fastening portion away from the rolling element chamber. The base of this radial cut-out may be parallel to the face of the fastening portion or, as shown in FIG. 7, oblique thereto. In this embodiment, the fastening portion 24 in the region of the radial cut-out 34 is not in contact with the wall 30 of the annular groove 27. Excess pressure in the rolling element chamber 2 can now lift the seal off from the wall 28 of annular groove 27, thus escaping to the outside through the open place 33a in the direction of the arrows X, X, by way of the cut-out 34.

Figure 8:
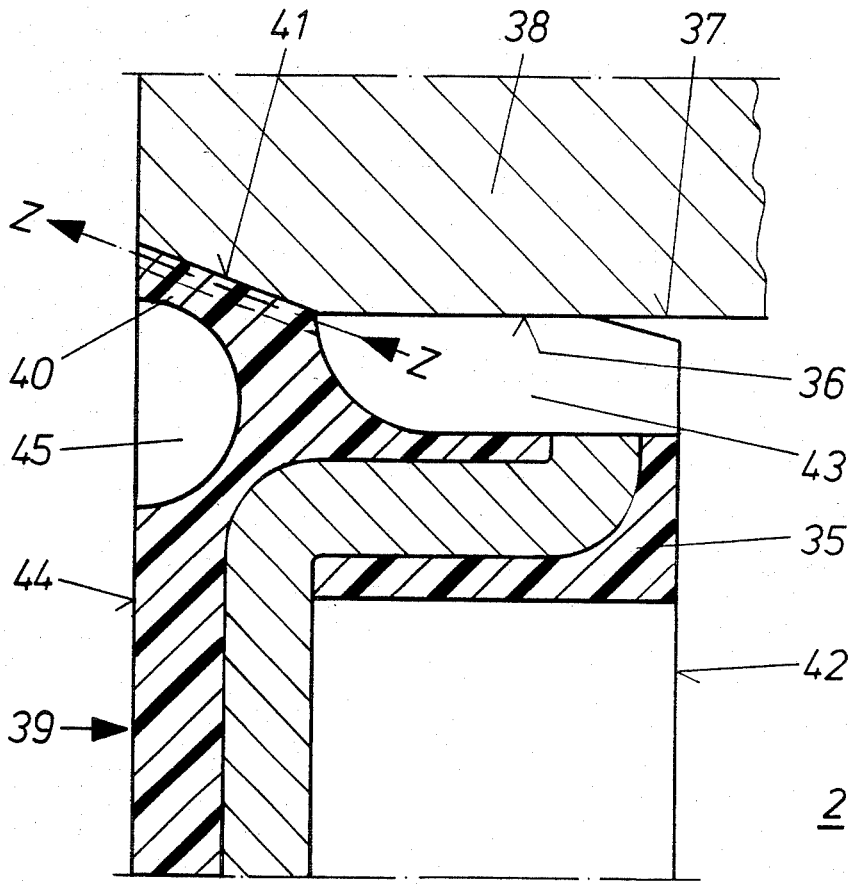

In the embodiment of FIG. 8, the seal 39 is secured not in an annular groove, but in the cylindrical shoulder surface of the outer race 38 by its substantially cylindrical periphery 36. The placement of the seal 39 is secured by a radially contacting outer margin 40, which contacts the chamfer 41 of the outer race 38 after being pressed into place. The weak spot is here formed by a cut-out 43 proceeding from the axially inner face 42 of the fastening portion 35 towards the rolling element chamber 2 and extending axially over only a portion of the depth of the fastening portion, and by a cut-out 45 (in the shape of a hemisphere or the like) extending axially from the outer margin in the face 44 away from the rolling element chamber 2 for some distance into the seal. The outer contact margin 40 not interrupted by the cut-out 43 is normally in contact with the chamfer 41 of the race 38 on its entire periphery. When excess pressure arises in the rolling element chamber 2, the seal 39 is lifted from the chamfer 41 in the weak spot formed by the cut-outs 43 and 45, to allow escape of the pressure to the outside through the open place, in the direction of the arrows Z, Z.

This invention is not limited to the embodiments disclosed above by way of example, but may be modified in various ways in the spirit of the invention. For example, the invention may also be employed in rolling element bearings of types other than the illustrated double-row angular contact ball bearings.

We claim:

1. In a bearing having rolling elements positioned to roll between a pair of races in a chamber sealed by a sealing element affixed to one of the races; the improvement wherein the sealing element has a flexible periphery and is mounted to hold said flexible periphery in sealing contact with an annular surface of said one race, said flexible periphery having a portion that is weakened with respect to adjacent portions to enable pressure within said chamber to be relieved by the flexible urging of said weakened portion away from said surface, said outer race having an annular groove therein, the outer periphery of said sealing element extending into said groove of said base and axially contacting the wall of said groove toward said rolling element chamber under stress, said radial cut-out extending through the axial depth of said sealing elements and radially inward in said sealing element to a depth that does not extend to the inner diameter of the wall of said groove toward said chamber.

2. In a bearing having rolling elements position to roll between a pair of races in a chamber sealed by a sealing element affixed to one of the races; the improvement wherein the sealing element has a flexible periphery and is mounted to hold said flexible periphery in sealing contact with a surface of said one race, said flexible periphery having a portion that is weakened with respect to adjacent portions to enable pressure within said chamber to be relieved by the flexible urging of said weakened portion away from said surface, said races being inner and outer races, said sealing element being disc-shaped and extending radially from one race to the other race, the outer race having an annular groove receiving the outer periphery of said sealing element, the outer periphery of said sealing element being held axially in contact under stress with the wall of said groove toward said chamber, said sealing element having a cut-out extending radially on the face of said sealing element away from said rolling element chamber for forming said weakened portion.

3. In a bearing having rolling elements positioned to roll between a pair of races in a chamber sealed by a sealing element affixed to one of the races, wherein said sealing element has peripheral surface that is flexible substantially throughout the circumference thereof and is positioned to axially sealingly engage an annular surface of said one race; the improvement wherein the dimensions of said elements are varied at a given location on the periphery of the sealing element, with respect to circumferentially adjacent positions, to hold said element against said surface with reduced pressure at said location as compared with adjacent positions, to enable pressure within said bearing to be released by the flexible urging of the sealing element at said location away from said surface.

4. The bearing of claim 3 wherein said annular surface of said one race is a wall of an annular groove in said one race into which said flexible periphery of said sealing element resiliently extends, said sealing element having an annular axially extending groove adjacent said periphery, and a cutout extending radially from said periphery at said location and positioned to reduce the pressure of said sealing element against said surface at said location.

* * * * *